(12) United States Patent
Otsu

(10) Patent No.: US 6,231,075 B1
(45) Date of Patent: May 15, 2001

(54) AUTOMOTIVE AIR BAG SYSTEM

(75) Inventor: Takashi Otsu, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/179,864

(22) Filed: Oct. 28, 1998

(30) Foreign Application Priority Data

Oct. 31, 1997 (JP) .................................................. 9-314653

(51) Int. Cl.⁷ .................................................. B60R 21/26
(52) U.S. Cl. .......................... 280/735; 280/735; 280/742
(58) Field of Search .................................. 280/735, 736, 280/742, 741, 737, 740

(56) References Cited

U.S. PATENT DOCUMENTS

| 5,433,475 | | 7/1995 | Kokeguchi | 280/736 |
| 5,618,057 | * | 4/1997 | Johnson et al. | 280/742 |
| 5,785,347 | * | 7/1998 | Adolph et al. | 280/735 |
| 5,820,162 | * | 10/1998 | Fink | 280/742 |
| 6,022,045 | * | 10/1998 | Faigle | 280/736 |
| 6,036,225 | * | 3/2000 | Foo et al. | 280/735 |

FOREIGN PATENT DOCUMENTS

| 5-24498 | 2/1993 | (JP) . |
| 6-1029 U | 1/1994 | (JP) . |
| 7-251694 | 10/1995 | (JP) . |

OTHER PUBLICATIONS

English Language Abstract for Japanese Publication No. 05024498.
English Language Abstract for Japanese Publication No. 06001029.

* cited by examiner

Primary Examiner—Eric Culbreth
(74) Attorney, Agent, or Firm—Smith, Gambrell & Russell

(57) ABSTRACT

An inflation system for inflating an air bag installed in a vehicle features an impact sensor for measuring an impact exerted on the vehicle and an inflator having a housing with a gas chamber and gas jettison opening for flowing the gas out of the housing and into the air bag. The inflator includes a first gas generator for inflating the air bag, a shutter for restricting gas flow through the gas jettison opening, and a second gas generator for moving the shutter to a reduced gas jettison opening area position. The housing and second gas generator are arranged such that the second gas generator directs the shutter into the outrushing gas flow leading to the jettison opening and shifts until the pressure balance on opposite sides of the axially shifting shutter are equal at which point the shuttle is in a flow limiting mode. A controller operates the first gas generator unit upon output of the impact sensor and the second gas generating unit when the output of the impact sensor is below a predetermined threshold value.

20 Claims, 5 Drawing Sheets

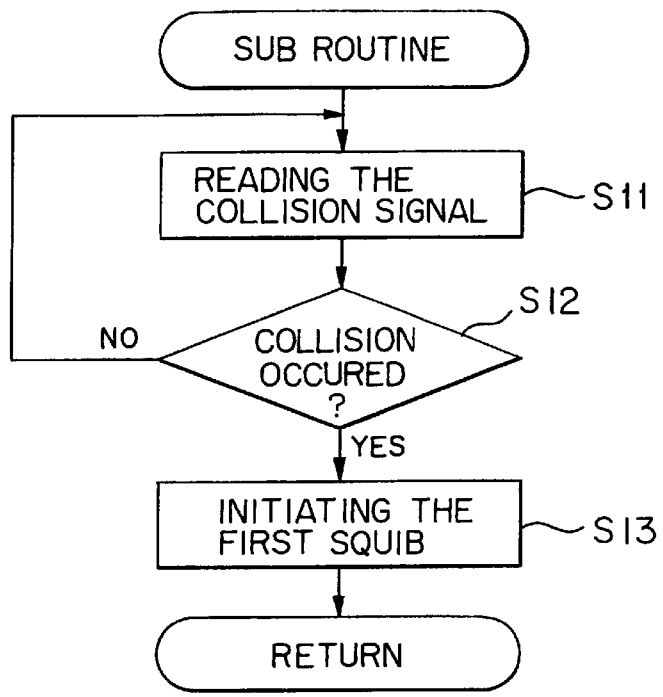
F I G. 5
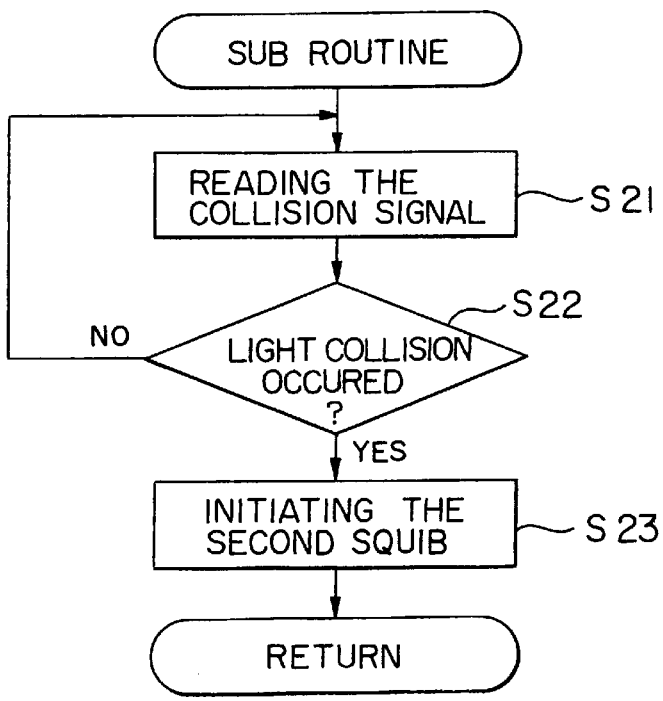
F I G. 6

AUTOMOTIVE AIR BAG SYSTEM

BACKGROUND OF THE INVENTION

1. Field of the Invention

The present invention relates to an automotive air bag system for protecting a passenger from injuring by an impact of a collision and, more specifically to the automotive air bag system with an inflator for inflating an air bag at a slow speed.

2. Description of the Related Art

As is generally known, an automotive air bag system has an air bag inflator which generates a gas quickly when a high acceleration is imparted to a vehicle due to, for example, a collision of the vehicle against an obstacle. The air bag is inflated under various conditions requiring different inflating speeds. Various inflating speed controllers have been proposed in, for example, JP-A Nos. 5-24498 and 7-251694, and JP-U No. 6-1029.

The inflating speed controller proposed in JP-A No. 5-24498 controls the inflating speed of the air bag by operating a valve plate by a gas generated by an inflator to control the amount of intake air by closing an air inlet opening formed in a holding box when the ambient temperature is high so that the air bag can be inflated at a substantially fixed inflating speed regardless of the variation of the ambient temperature.

The inflating speed controller proposed in JP-U No. 6-1029 controls the inflating speed of the air bag by breaking a resin plate formed on an air bag case by an internal pressure of the air bag to reduce the internal pressure of the air bag to avoid imparting an excessively high impact on a vehicle passenger the suddenly inflating air bag when the air bag is unable to inflate smoothly at the initial stage of inflation and starts inflating suddenly due to the sharp increase of the internal pressure of the air bag.

The inflating speed controller proposed in JP-A No. 7-251694 supplies a gas generated by an inflator through a narrow passage to an air bag to inflate the air bag at a relatively low inflating speed at the initial stage of combustion in the inflator, and removes a baffle plate disposed in the gas passage by the pressure of the gas increasing with the progress of combustion in the inflator to expand the gas passage so that the inflating speed of the air bag is increased to avoid imparting a sudden impact to an infant or a vehicle passenger by the sudden inflation of the air bag at the initial stage of inflation.

No prior art inflating speed controllers can control the inflation of the air bag properly and the air bag is inflated at an excessively high inflating speed when the vehicle collides lightly against an obstacle while the vehicle is traveling at a relatively low traveling speed and a relatively light shock is exerted on the vehicle. Generally, the air bag is provided with a gas discharging hole to absorb energy moderately, and the air bag is held fully inflated only a very short time. The data on the air bag are determined for appropriately securing the passenger from a strong impact that may be imparted to the passenger when the vehicle collides with an obstacle while traveling at a very high speed. Therefore, the passenger will plunge into the air bag after the air bag has been fully inflated and has started deflating if the vehicle collides against an obstacle with a relatively low impact while the same is traveling at a low traveling speed, and the function of the air bag may not fully be utilized.

SUMMARY OF THE INVENTION

Accordingly, it is an object of the present invention to provide an automotive air bag inflator for controlling an inflating speed of an air bag according to an intensity of an impact in dependency on collision modes of the vehicle against an obstacle, so that the air bag is inflated at a very high inflating speed to protect a passenger when the intensity of the impact is high, and the air bag is inflated at a reduced inflating speed when the intensity of the impact is low.

According to a first aspect of the present invention, an automotive air bag system mounted on the vehicle has an inflator, an impact sensor for measuring a magnitude of an impact exerted on the vehicle, first gas generating means for generating a gas for inflating an air bag, a housing with gas jetting openings in a wall, gas flow restricting means for restricting a gas flow through the gas jetting openings, second gas generating means for operating the gas flow restricting means, and a controller for controlling the first and the second gas generating means on the basis of a collision signal provided by the impact sensor. In this automotive air bag system, the controller initiates the first gas generating means to inflate the air bag upon receiving the collision signal provided by the impact sensor, and it initiates the second gas generating means to operate the gas flow restricting means so that a flow rate of the gas into the air bag is limited when the magnitude of the impact measured by the impact sensor is below a predetermined threshold value.

In the automotive air bag system, the controller may initiate the second gas generating means when an integral of the collision signal provided by the collision sensor for a predetermined time is less than a predetermined value.

In the automotive air bag system, the gas flow restricting means may be a movable shutter which reduces the area of each of the gas jettison holes to reduce the rate of flow of the gas into the air bag.

Preferably, the movable shutter has a peripheral part slidably fitted in the housing, and a sealing part for defining a sealed space together with the second gas generating means, and the movable shutter may be forced to slide and held at a position to reduce the area of each of the gas jettison holes when a gas is generated in the sealed space by initiating the second gas generating means.

The automotive air bag system may further comprise a seat belt sensor for monitoring whether or not a seat belt is fastened to hold a passenger on a seat, and the controller may inhibit initiate the second gas generating means when the seat belt sensor provides a signal indicating that the seat belt is not fastened.

When the vehicle receives a strong impact upon collision with another object, the controller provides a gas jetting signal to the first gas generating means to generate a gas suddenly. The generated gas is jetted through the gas jettison holes into the air bag to inflate the air bag. At this stage, the second gas jetting signal is not provided and the gas jettison hole is not closed by the movable shutter, Therefore, the gas jettison hole has a large area and the air bag is inflated in a moment to protect the passenger.

BRIEF DESCRIPTION OF THE DRAWINGS

The above and other objects features and advantages of the present invention will become more understood from the following description by referring the accompanying drawings, in which:

FIG. 5 is a flow chart of a first squib initiating procedure;

FIG. 6 is a flow chart of a second squib initiating procedure;

DESCRIPTION OF THE PREFERRED EMBODIMENTS

Figure 1:
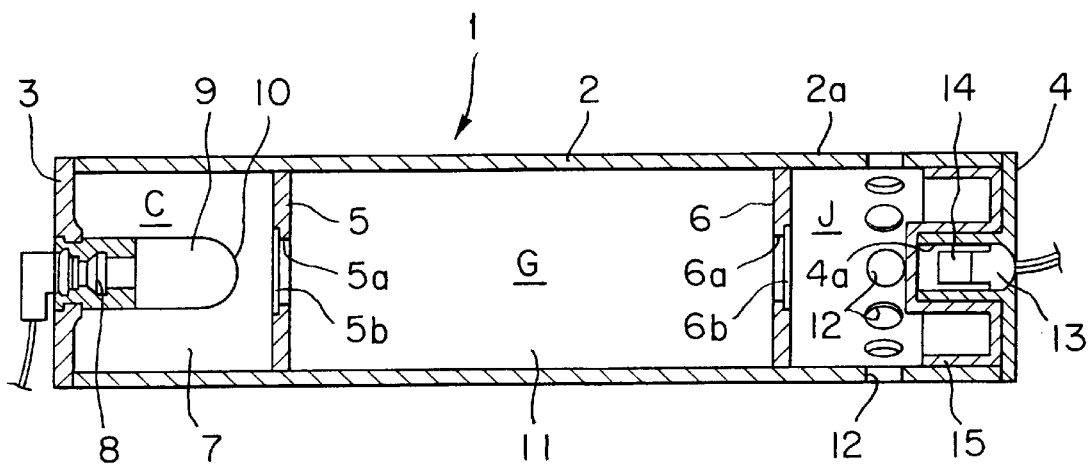
FIG. 1 is a sectional view of an air bag inflator included in an air bag system in a first embodiment according to the present invention.

Referring to FIG. 1, an air bag inflator 1 included in an air bag system in a first embodiment according to the present invention comprises a housing 2 having opposite open ends, a circular first lid 3 and a circular second lid 4 closing the opposite open ends of the housing 2, a circular first partition wall 5 and a circular second partition wall 6 disposed inside the housing 2, axially spaced from each other and welded to the housing 2 to partition a space defined by the housing 2 into three chambers. The partition walls 5 and 6 are provided with central openings 5a and 6a, and metal sealing plates 5b and 6b are attached to the partition walls 5 and 6 so as to cover the openings 5a and 6a, respectively. The first partition wall 5, the first lid 3 and a part of the housing 2 define a combustion chamber C. The combustion chamber C is filled with an oxidizer 7, such as oxygen gas or the like. A first squib (igniter) 8 and a combustible material container 10 containing a combustible material 9, such as hydrogen gas, are disposed in the combustion chamber C and mounted on the first lid 3. The first squib 8 is initiated by a first gas jetting signal provided by a controller 20 upon the reception of a collision signal from a collision sensor 19 capable of sensing an impact exerted on a vehicle. The partition walls 5 and 6 and a part of the housing 2 define a high-pressure gas chamber G in the middle part of the space defined by the housing 2, and the high-pressure gas chamber G is filled with an inert gas 11, such as argon gas. The first squib 8, the combustible material container 10, and the members defining the combustion chamber C and the high-pressure gas chamber G constitute a first gas generating unit.

Figure 2:
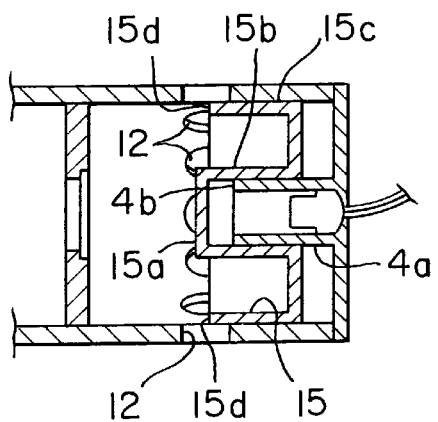
FIG. 2 is a fragmentary sectional view of the air bag inflator of FIG. 1.

The second partition wall 6, the second lid 4 and a part 2a of the housing 2 define a gas jetting chamber J. The part 2a of the housing 2 is provided with a plurality of gas jettison holes 12 at angular intervals. A gas is jetted into an air bag, not shown, through the gas jettison holes 12. As shown in FIG. 2, the second lid 4 has a cylindrical projection 4a having an open inner end 4b coaxially projecting a central part thereof into the gas jetting chamber J. A second squib 13 and a combustible material container 14 containing a combustible material are placed in the cylindrical projection 4a. The second squib 13 is initiated by a second gas jetting signal provided by the controller 20, and the combustible material container 14 jets a gas through the open inner end 4b of the cylindrical projection 4a. The second squib 13 and the second combustible material container 14 constitute a second gas generating unit.

An axially movable shutter 15 is fitted in the second end of the housing 2 so as to cover the cylindrical projection 4a containing the second gas generating unit. The axially movable shutter 15 has a central cylindrical projection 15b having a bottom wall 15a at its inner end, a cylindrical rim 15c fitted in the part 2a of the housing 2 and having a covering part 15d for covering the gas jettison holes 12. The cylindrical projection 4a of the second lid 4 is fitted in the central cylindrical projection 15b of the axially movable shutter 15.

In an original state, the gas jettison holes 12 are not covered with cylindrical rim 15c of the axially movable shutter 15. If the second squib 13 is initiated by a second gas jetting signal, the second gas generating unit generates a gas to shift the axially movable shutter 15 to the left, as viewed in FIG. 1, in the gas jetting chamber J so that the gas jettison holes 12 are partly covered with the cylindrical rim 15c of the axially movable shutter 15 as shown in FIG. 2 to reduce the respective areas of the gas jettison holes 12. The pressure of a gas generated by the first gas generating unit and pressing the axially movable shutter 15 to the right and the pressure of a gas generated by the second gas generating unit and pressing the axially movable shutter 15 to the left balance each other, so that the axially movable shutter 15 is held at a position to cover the gas jetting holes 12 partly with the covering part 15d of the cylindrical rim 15c thereof so that the respective areas of the gas jettison holes 12 are reduced. The shape and dimensions of the axially movable shutter 15 are designed so that the axially movable shutter 15 can be held at the position to cover the gas jettison holes 12 partly with the covering part 15d of the cylindrical rim 15c thereof so that the respective areas of the gas jettison holes 12 are reduced.

Figure 3:
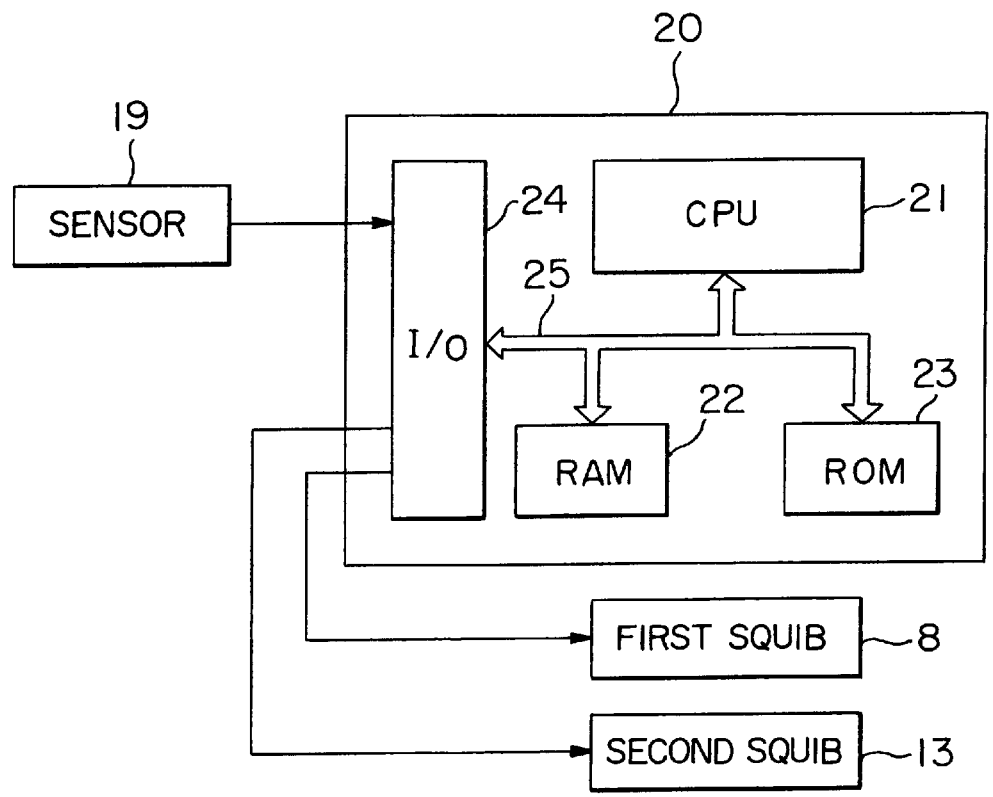
FIG. 3 is a block diagram of a controller included in the air bag system of the present invention.

Referring to FIG. 3, the controller 20 has a microcomputer as a main component comprising a CPU 21, a RAM 22, a ROM 23, an I/O interface 24, and bus lines for interconnecting those components. A collision sensor 19 is connected to the input port of the I/O interface 24, and the first squib 8 and the second squib 13 are connected to the output port of the I/O interface 24. ROM 23 stores an air bag inflation control program, and fixed data for deciding the severity of a collision, i.e., a light collision and a heavy collision. The RAM 22 stores data obtained by processing the output signal of the collision sensor 19 and data processed by the CPU 21. The CPU 21 processes the output signal of the collision sensor 19, i.e., a collision signal, received through the I/O interface 24 according to a control program stored in the ROM 23, and executes a squib initiation control operation for initiating the first squib 8 and the second squib 13 on the basis of the fixed data stored in the RAM 23 and the data stored in the ROM 23.

Figure 4:
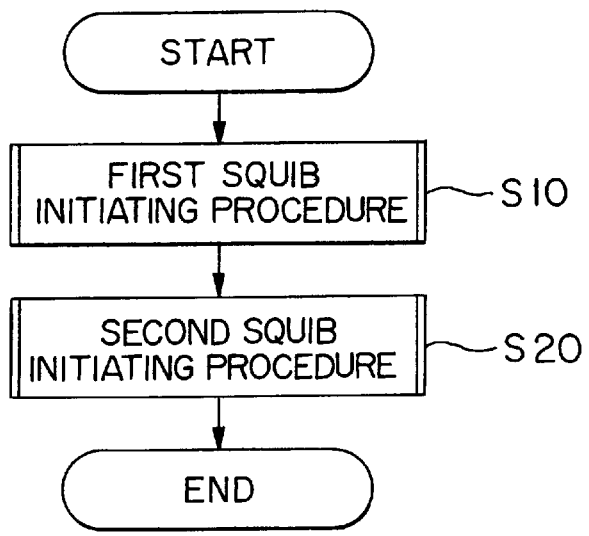
FIG. 4 is a flow chart of a procedure to be carried out by the controller of FIG. 3.

Upon the sensing of an impact, the collision sensor 19 sends a collision signal representing the waveform of the impact to the controller 20. Then, the controller 20 executes control operations expressed by flow charts in FIGS. 4 to 6. In a main control program shown in FIG. 4, a first squib initiating procedure is executed in step S10, and a second squib initiating procedure is executed in step S20.

Referring to FIG. 5 showing the first squib initiating procedure to be executed in step S10 of the main control program, the output of the collision sensor 19 expressing the waveform of the impact is read in step S11. And, the collision signal provided by the collision sensor 19 is compared with the fixed data stored in the ROM 23 to decide whether or not a collision occurred in step S12. If the decision in step S12 is affirmative, i.e., if it is decided that a collision occurred in step S12, the controller 20 gives a first squib initiation signal to ignite the explosive of the first squib 8 in step S13. If the decision in step S12 is negative, i.e., if it is decided that any collision has not occurred, the program returns to step S11 to read the collision signal provided by the collision sensor 19. After the first squib 8 has been initiated, the program returns to step S20 of the main control program.

When the explosive of the first squib 8 is initiated and explodes, the pressure of explosion bursts the combustible material container 10 containing the combustible material 9 and the heat of explosion ignites the combustible material 9. Then, the combustible material 9 reacts with the oxidizer 7 sealed in the combustion chamber C. Consequently, a high-temperature gas is generated in the combustion chamber C to break the first sealing plate 5b and the high-temperature gas flows into the high-pressure gas chamber G. The inert gas 11 contained in the high-temperature gas chamber G is heated by the high-temperature gas and expands suddenly, the pressure in the high-pressure gas chamber G rises sharply. Consequently, the second sealing plate 6b attached to the second partition wall 6 is broken, the high-pressure inert gas 11 flows through the gas jetting holes 12 of the gas jetting chamber J into the air bag, not shown.

The controller 20 continues monitoring the waveform of the collision signal provided by the collision sensor 19 after the first squib 8 has been initiated. Referring to FIG. 6, the controller 20 reads the collision signal provided by the collision sensor 19, integrates values of impacts represented by the collision signal provided by the collision sensor 19 in step S21, and compares the integral of the collision signal with the fixed data stored in the ROM 23 in step S22 to see whether or not a light collision occurred. If an affirmative decision is made in step S22, i.e., if it is decided that a light collision occurred, The controller provides a second squib initiating signal to initiate the second squib 13 in an optimum timing. If a negative decision is made in step S22, i.e., if any light collision did not occur, the program returns to step S21.

Thus, the first squib initiating signal to initiate the first squib 8 is provided when a momentary value of the collision signal provided by the collision sensor 19 is larger than a predetermined value, that is, the first squib initiating signal is given when the magnitude of an impact exerted on the vehicle corresponds to that of an impact may be exerted in case of a heavy collision. On the other hand, the second squib initiating signal to initiate the second squib 13 is provided when the integral of the collision signal for a predetermined time after the first squib initiating signal has been provided is smaller than a predetermined value.

Figure 8:
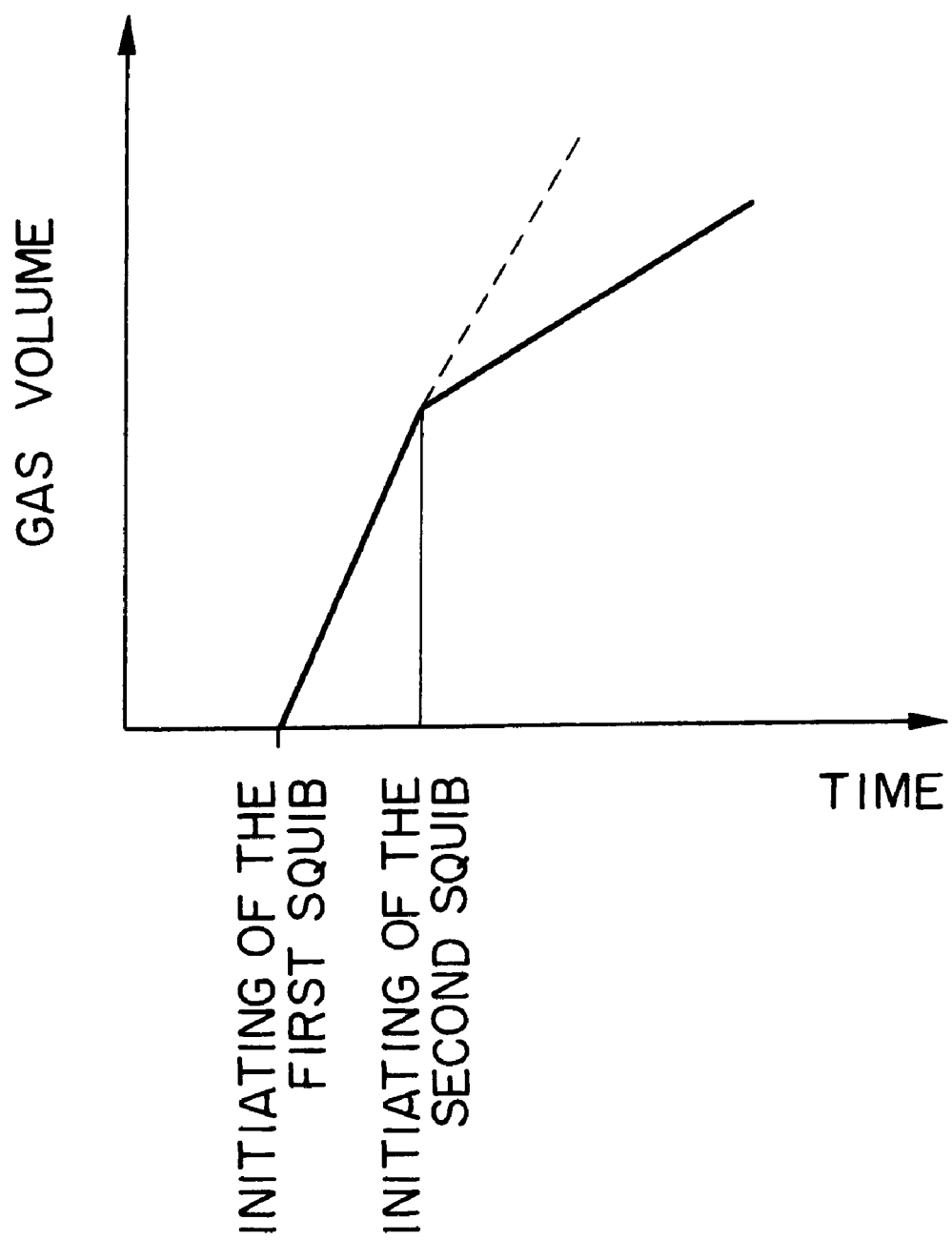
FIG. 8 is a graph showing the variation of the quantity of a jetted gas with time.

When the second squib 13 is initiated, the combustible material contained in the combustible material container 14 is ignited, and a high-pressure combustion gas generated by the combustion of the combustible material acts on the bottom wall 15a of the cylindrical projection 15b of the axially movable shutter 15 to shift the axially movable shutter 15 to the left as viewed in FIG. 1. Consequently, the gas jettison holes 12 are partly closed, so that the rate of flow of the high-pressure inert gas 11 heated by the high-temperature gas generated in the combustion chamber C into the air bag is reduced and the quantity of the high-pressure inert gas 11 inflating the air bag increases along a curve shown in FIG. 8. Thus, the air bag is inflated in two stages.

Figure 7:
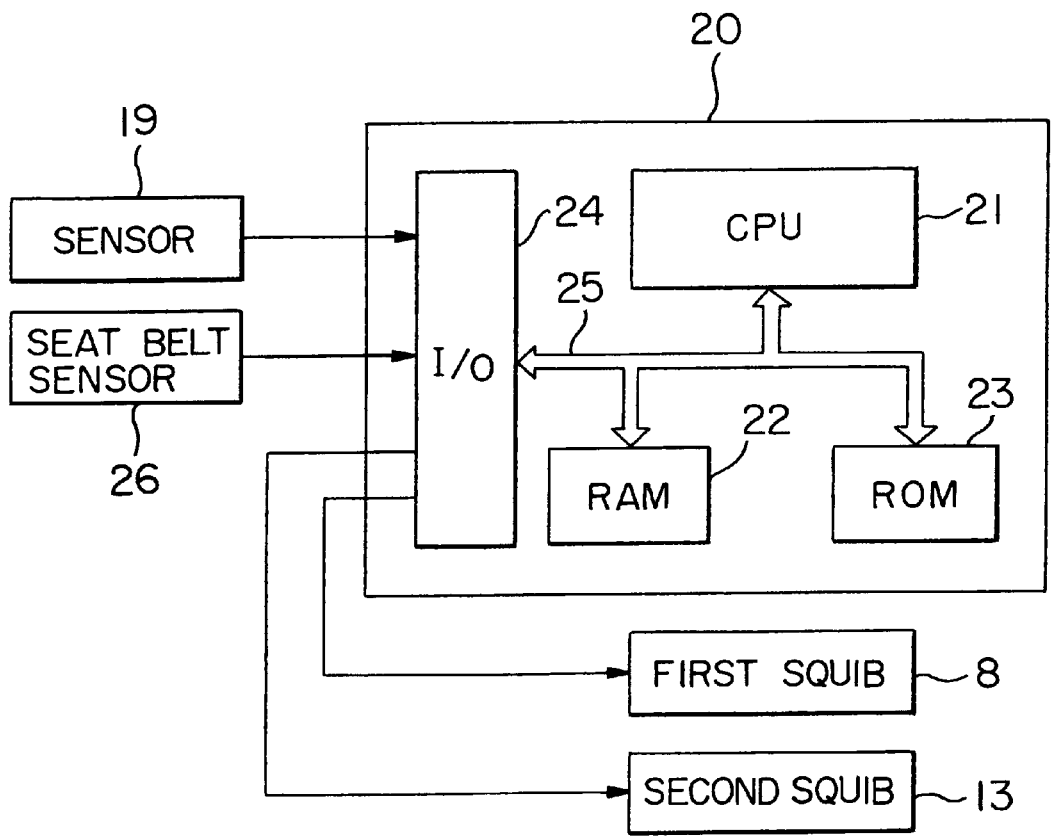
FIG. 7 is a block diagram of a controller included in an automotive air bag system in a second embodiment according to the present invention.

The air bag system in a second embodiment according to the present invention is provided with a controller 20 shown in FIG. 7. The air bag system in the second embodiment is the same in function and configuration as the air bag system in the first embodiment, except that the controller 20 of the air bag system in the second embodiment uses the output signal of a seat belt sensor 26 in addition to the output signal of a collision sensor 19.

The controller 20 included in the air bag system in the second embodiment will be described by referring FIG. 7, in which parts like or corresponding to those shown in FIG. 3 are designated by the same reference characters and the description thereof will be omitted. Plunging mode of the passenger into the air bag is decided by the fact that the seat belt is fastened to hold the passenger on the seat. In the second embodiment, the output signal of the seat belt sensor 26 is used for inflating the air bag at an optimum inflating speed. It is assumed that the upper body of the passenger falls quickly forward when the seat belt is not fastened. Therefore, when the output of the seat belt sensor 26 indicates that the seat belt is not fastened, the initiation of the second squib 13 is inhibited to avoid the inflation of the air bag from retarding. When the output of the seat belt sensor 26 indicates that the seat belt is fastened, the second squib 13 is initiated by the control procedure previously described with reference to FIG. 6.

The axially movable shutter 15 may be shifted by a solenoid actuator or the like instead of by the pressure of the combustion gas. A cylindrical rotary shutter provided with openings respectively coinciding with the gas jettison holes 12 may be employed instead of the axially movable shutter 15. The cylindrical rotary shutter may be fitted in the gas jetting chamber J, and may be turned so as to cover the gas jettison holes 12 partly by a solenoid actuator or the pressure of the combustion gas.

A generally used acceleration sensor may be employed instead of the collision sensor capable of sensing impacts that are exerted on the vehicle when the vehicle collides against an obstacle.

As is understood from the foregoing description, the controller of the air bag system of the present invention controls the inflating speed of the air bag according to the magnitude of the impact exerted on the vehicle so that the air bag is inflated at a high inflating speed in case of a heavy collision, and the air bag is inflated at a low inflating speed in case of a light collision.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. An air bag system installed in a vehicle comprising:

an air bag;

an impact sensor for measuring a magnitude of impact exerted on the vehicle;

an inflator comprising;

a first gas generating means for generating a gas for inflating said air bag;

a housing with gas jettison openings in a wall thereof for jettisoning said gas into said air bag;

gas flow restricting means for restricting flow of the gas through the gas jettison openings of the housing;

second gas generating means for operating said gas flow restricting means;

a controller for controlling said first and second gas generating means on the basis of a collision signal provided by said impact sensor; and said controller initiating said first gas generating means to inflate said air bag upon the reception of said collision signal and initiating said second gas generating means to adjust said gas flow restricting means to a gas flow limiting setting so as to limit a flow rate of the gas into said air bag when a sensed magnitude of impact is below a predetermined threshold value, and wherein said gas flow restricting means includes a moveable shutter which is dimensioned to preclude gas flow from a first side of said movable shutter, which first side receives the impact of the gas flow of said first gas generating means, to a second side of said movable shutter, which second side contacts with gas produced by said second gas generating means, such that a pressure balancing is achieved when said movable shutter is in the gas flow limiting setting.

2. The system according to claim 1, wherein;

said controller initiates said second gas generating means when an integral of the collision signal is less than a predetermined value.

3. The system according to claim 1, wherein:

said movable shutter shifts along a central axis of said housing for reducing an area of each gas jettison opening.

4. The system according to claim 3, wherein:

said movable shutter comprises a peripheral wall section slidably fitted in said housing and a back wall section which defines a sealed space together with said second gas generating means.

5. The system according to claim 1, further comprising:

a seat belt sensor for monitoring whether or not a seat belt is fastened to hold a passenger on a seat, wherein said controller inhibits the initiation of said second gas generating means when said seat belt sensor provides a signal indicating that the seat belt is unfastened.

6. An air bag inflation system for a vehicle, comprising:

impact detecting means for detecting an impact exerted on the vehicle;

a housing for storing a high pressure gas therein;

first gas generating means for inflating an air bag;

gas jettison openings provided in said housing for jetting the high pressure gas into the air bag from said housing;

a movable shutter provided in said housing and adjustable with respect to said housing into a flow limiting setting with a reduced area in each of said gas jettison openings;

second gas generating means for generating gas so as to adjust said movable shutter:

a controller for controlling said first gas generating means when said impact detecting means detects an impact exerted on the vehicle, and for also initiating said second gas generating means for moving said movable shutter to the flow limiting setting when said impact detecting means detects an impact of less than a predetermined value, and wherein said first gas generating means and said second said generating means are positioned to opposite sides of said jettison openings with respect to an axial direction of elongation of said housing such that gas generated by said first gas generating means impacts on a first side of said movable shutter and, upon initiation of said second gas generating means, gas flow from said second gas generating means impacts on another side of said shutter to adjust the shutter to the flow limiting setting against resistance imposed by gas from said first gas generating means;

said second gas generating means generating a second gas pressure for pressing said movable shutter in a first direction from an initial setting toward the flow limiting setting;

said first gas generating means generating a first gas pressure for pressing said movable shutter in a second direction opposite the first direction; and wherein the first and second gas pressures are balanced so as to hold said movable shutter at the flow limiting setting.

7. The apparatus of claim 6 wherein said first and second gas generating means are positioned on opposite sides of said movable shutter, and said movable shutter is arranged so as to remain to one side of an upstream end, with respect to air bag inflation gas flow, of said jettison openings both when in the flow limiting setting and when in a maximum open state.

8. An air bag inflation system for a vehicle, comprising:

an impact sensor;

an inflator, said inflator comprising;

an air bag filling gas generator, a housing having a gas jettison opening which receives gas from said air bag filling gas generator and is in gas flow communication with an air bag, a gas flow restrictor that is movable with respect to said housing and positionable into a gas flow limiting setting so as to restrict gas flow passing through the jettison opening;

a restrictor adjustment means for adjusting said gas flow restrictor;

a controller for controlling said air bag filling gas generator when said impact sensor senses a vehicle impact condition, and for initiating said restrictor adjustment means to adjust said gas flow restrictor so as to limit a flow rate of gas into the air bag when said impact sensor senses a vehicle impact condition below a predetermined level, and wherein said restrictor adjustment means adjusts said restrictor farther into the path of incoming gas produced by said air bag filling gas generator in moving from an initial setting into the gas flow limiting setting; and wherein, when said restrictor adjustment means is not in operation, said restrictor is in a non-gas flow obstruction position with respect to the gas flow generated by said air bag filling gas generator.

9. The system of claim 8 wherein said restrictor is dimensioned so as to form a pressure seal with respect to said housing and wherein said air bag filling gas generator produces a first gas pressure level on the restrictor and said restrictor adjustment means includes an adjustment gas generator which generates a gas that produces a second pressure level on said restrictor, with said first and second pressure levels being balanced when said restrictor is in said gas flow limiting setting.

10. The system of claim 8 wherein said restrictor, when in the initial setting is in a fully open, non-restricting gas flow setting with respect to a plurality of gas jettison openings formed in said housing upstream of said restrictor, when said restrictor is in the initial setting.

11. The system of claim 8 wherein said restrictor is in a filly non-restricting gas flow setting with respect to said jettison opening when in the initial setting.

12. The system of claim 8 wherein said restrictor is dimensioned and arranged to slide axially in a direction of elongation of said housing.

13. The system of claim 12 wherein said restrictor adjustment means includes a restrictor adjustment gas generator and said restrictor is dimensioned to preclude gas flow from a first side of said restrictor, which receives the impact of the gas flow of said air bag filling gas generator, to a second side of said restrictor which contacts with gas produced by said restrictor adjustment gas generator such that a pressure balance is achieved on opposite sides of said restrictor when said restrictor is in said flow limiting setting.

14. The system of claim 8 wherein said inflator includes a gas chamber that is sealed from said jettison opening by a seal positioned upstream, with respect to gas flow of said air bag filling gas generator, and wherein the gas flow of said air bag filling gas generator includes gas derived from gas in said chamber which chamber gas is directed axially within a direction of elongation of said housing through said seal following a rupturing of said seal into abutment with the restrictor being adjusted axially by said restrictor adjustment means.

15. The system of claim 8 wherein said restrictor adjustment means includes a restricted adjustment gas generator and the restrictor divides said housing into a first chamber and a second chamber with the first chamber containing the gas flow of said air bag filling gas generator which gas flow impacts a first side of said restrictor and the second chamber of said housing containing gas generated by said restrictor adjustment gas generator which impacts an opposite side of said restrictor, which restrictor is dimensioned so as to have pressure of the gas in said first chamber balance the pressure of the gas in the second chamber when said restrictor is in the gas flow limiting setting.

16. The system of claim 8 wherein said restrictor is positioned within said housing to one side of an upstream end, with respect to gas flow of said air bag filling gas generator, of the jettison opening both when in the initial setting and when in the gas flow limiting setting.

17. The system of claim 8 wherein said air bag filling gas generator and said restrictor adjustment means each include combustion material containers which are positioned along a common axis of said housing and wherein said restrictor shifts in position in a direction that is in common with said common axis.

18. An air bag inflation system for a vehicle, comprising:
an impact sensor;
an inflator, said inflator comprising;
an air bag filling gas generator,
a housing having a gas jettison opening which receives gas from said air bag filling gas generator and is in gas flow communication with an air bag,
a gas flow restrictor that is movable with respect to said housing and positionable into a gas flow limiting setting so as to restrict gas flow passing through the jettison opening;
a restrictor adjustment means for adjusting said gas flow restrictor;
a controller for controlling said air bag filling gas generator when said impact sensor senses a vehicle impact condition, and for initiating said restrictor adjustment means to adjust said gas flow restrictor so as to limit a flow rate of gas into the air bag when said impact sensor senses a vehicle impact condition below a predetermined level, and
wherein said restrictor adjustment means adjusts said restrictor farther into the path of incoming gas produced by said air bag filling gas generator in moving from an initial setting into the gas flow limiting setting,
wherein said restrictor adjustment means includes a restricted adjustment gas generator and the restrictor divides said housing into a first chamber and a second chamber with the first chamber containing the gas flow of said air bag filling gas generator which gas flow impacts a first side of said restrictor and the second chamber of said housing containing gas generated by said restrictor adjustment gas generator which impacts an opposite side of said restrictor, which restrictor is dimensioned so as to have pressure of the gas in said first chamber balance the pressure of the gas in the second chamber when said restrictor is in the gas flow limiting setting; and
wherein said restrictor includes a compartment for receiving detonation material of said restrictor adjustment gas generator.

19. The system of claim 18 wherein said restrictor is axially adjustable along a common direction of elongation of said housing upon initiation of said restrictor adjustment means, and said restrictor is positioned in a non-obstruction position prior to activation of said restrictor adjustment means.

20. An air bag inflation system for a vehicle, comprising:
an impact sensor;
an inflator, said inflator comprising;
an air bag filling gas generator,
a housing having a gas jettison opening which receives gas from said air bag filling gas generator and is in gas flow communication with an air bag,
a gas flow restrictor that is movable with respect to said housing and positionable into a gas flow limiting setting so as to restrict gas flow passing through the jettison opening;
a restrictor adjustment means for adjusting said gas flow restrictor;
a controller for controlling said air bag filling gas generator when said impact sensor senses a vehicle impact condition, and for initiating said restrictor adjustment means to adjust said gas flow restrictor so as to limit a flow rate of gas into the air bag when said impact sensor senses a vehicle impact condition below a predetermined level, and
wherein said restrictor adjustment means adjusts said restrictor farther into the path of incoming gas produced by said air bag filling gas generator in moving from an initial setting into the gas flow limiting setting;
wherein said inflator includes a gas chamber that is sealed form said jettison opening by a seal positioned upstream, with respect to gas flow of said air bag filling gas generator, and wherein the gas flow of said air bag filling gas generator includes gas derived from gas in said chamber which chamber gas is directed axially within a direction of elongation of said housing through said seal following a rupturing of said seal into abutment with the restrictor being adjusted axially by said restrictor adjustment means; and
wherein said restrictor adjustment means includes gas generating means having a combustible material container, and said combustible material container is received within a chamber defined by said restrictor.

* * * * *